(12) United States Patent
Namiki et al.

(10) Patent No.: US 10,897,125 B2
(45) Date of Patent: Jan. 19, 2021

(54) BEND PROTECTOR

(71) Applicants: Yazaki Corporation, Tokyo (JP); Subaru Corporation, Tokyo (JP)

(72) Inventors: Shintaro Namiki, Susono (JP); Satoshi Uematsu, Susono (JP); Shouta Yoshida, Tokyo (JP); Shouya Takahashi, Tokyo (JP)

(73) Assignees: Yazaki Corporation, Tokyo (JP); Subaru Corporation, Tokyo (JP)

( * ) Notice: Subject to any disclaimer, the term of this patent is extended or adjusted under 35 U.S.C. 154(b) by 0 days.

(21) Appl. No.: 16/432,458

(22) Filed: Jun. 5, 2019

(65) Prior Publication Data

US 2019/0379189 A1    Dec. 12, 2019

(30) Foreign Application Priority Data

Jun. 6, 2018 (JP) ................................ 2018-108322

(51) Int. Cl.
    *H02G 3/04*      (2006.01)

(52) U.S. Cl.
    CPC ................................. *H02G 3/0456* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 3,173,987 A | * | 3/1965 | Potruch | H02G 15/076 174/545 |
| 3,283,059 A | * | 11/1966 | Plummer | H02G 15/076 174/38 |
| 3,431,349 A | * | 3/1969 | Hamilton | H02G 15/10 174/38 |
| 3,466,380 A | * | 9/1969 | Graff | H02G 15/076 174/38 |
| 3,518,358 A | * | 6/1970 | Brown | H02G 15/043 174/138 F |
| 3,557,299 A | * | 1/1971 | Dienes | H02G 15/076 174/38 |
| 3,604,835 A | * | 9/1971 | Hamilton | H02G 15/10 174/38 |
| 3,769,443 A | * | 10/1973 | Pierzchala | H02G 15/105 174/38 |

(Continued)

FOREIGN PATENT DOCUMENTS

| | | |
|---|---|---|
| JP | 2000-209732 A | 7/2000 |
| JP | 2005-295607 A | 10/2005 |

*Primary Examiner* — Jenny L Wagner
*Assistant Examiner* — Krystal Robinson
(74) *Attorney, Agent, or Firm* — Banner & Witcoff, Ltd.

(57) ABSTRACT

A bend protector for holding an electrical wire in a bent state includes: an electrical wire inlet provided on one side and formed as an inlet of the electrical wire; an electrical wire outlet provided on the same side as the electrical wire inlet and formed as an outlet of the electrical wire; and a bend holder provided on the other side opposite to the one side so as to hold the electrical wire in the bent state, in which the bend holder includes: a pocket portion formed by a first wall and a second wall extending in a direction intersecting with respect to a direction from the one side toward the other side, and the pocket portion includes an internal space, and the internal space has a part having a distance greater than a distance between the first wall and the second wall.

4 Claims, 4 Drawing Sheets

(56) References Cited

U.S. PATENT DOCUMENTS

| | | | | |
|---|---|---|---|---|
| 5,149,017 A * | 9/1992 | McEntire | B64F 1/305 | 14/71.5 |
| 5,151,050 A * | 9/1992 | Scholz | H01R 13/58 | 439/456 |
| 5,235,134 A * | 8/1993 | Jaycox | G02B 6/4444 | 156/49 |
| 5,302,779 A * | 4/1994 | Morel | H02G 15/192 | 174/92 |
| 5,378,166 A * | 1/1995 | Gallagher, Sr. | H01R 13/518 | 439/214 |
| 5,688,135 A * | 11/1997 | Gallagher, Sr. | B60R 16/0215 | 174/72 A |
| 5,704,797 A * | 1/1998 | Meyerhoefer | H01R 4/2433 | 200/51.12 |
| 6,118,076 A * | 9/2000 | Damm | H02G 15/113 | 174/77 R |
| 6,199,322 B1 * | 3/2001 | Itami | E05F 15/638 | 192/12 B |
| 6,570,093 B2 * | 5/2003 | Doshita | B60R 16/0215 | 174/135 |
| 6,747,208 B2 * | 6/2004 | Miyamoto | B60R 16/0215 | 174/135 |
| 6,818,827 B2 * | 11/2004 | Kato | B60R 16/0215 | 174/135 |
| 7,038,133 B2 * | 5/2006 | Arai | H02G 3/0418 | 138/115 |
| 7,075,011 B1 * | 7/2006 | Kogure | B60R 16/0215 | 174/135 |
| 7,994,426 B1 * | 8/2011 | Rizzuto, Jr. | B65H 75/362 | 174/92 |
| 8,120,922 B2 * | 2/2012 | Randall | G11B 33/128 | 361/725 |
| 8,575,487 B2 * | 11/2013 | Agusa | B60R 16/0215 | 174/68.3 |
| 8,624,114 B2 * | 1/2014 | Oga | B60R 16/0215 | 174/72 R |
| 9,029,701 B2 * | 5/2015 | Hara | H02G 3/04 | 174/72 A |
| 9,511,725 B2 * | 12/2016 | Nagayasu | H02G 11/00 | |
| 9,533,634 B2 * | 1/2017 | Kogure | B60J 5/06 | |
| 9,672,959 B2 * | 6/2017 | Sakaki | H01B 7/16 | |
| 9,742,172 B2 * | 8/2017 | Elford | H02G 3/088 | |
| 10,135,229 B2 * | 11/2018 | Matsumura | H02G 3/0437 | |
| 10,315,594 B2 * | 6/2019 | Yamamoto | B60R 16/03 | |
| 2001/0052203 A1 * | 12/2001 | Doshita | B60R 16/0215 | 49/502 |
| 2002/0014348 A1 * | 2/2002 | Aoki | H02G 11/006 | 174/72 A |
| 2005/0264033 A1 * | 12/2005 | Aoki | E05D 11/0081 | 296/155 |
| 2014/0020952 A1 * | 1/2014 | Nagayasu | B60R 16/027 | 174/72 A |
| 2014/0202571 A1 * | 7/2014 | Spijker | F16L 9/18 | 138/108 |
| 2015/0165987 A1 * | 6/2015 | Hayakawa | H01B 3/30 | 174/72 A |
| 2015/0279515 A1 * | 10/2015 | Huang | A61L 31/041 | 174/72 A |
| 2016/0180989 A1 * | 6/2016 | Nakai | H02G 3/0443 | 174/72 A |
| 2016/0190782 A1 * | 6/2016 | Tsukamoto | H02G 3/0406 | 174/72 A |
| 2020/0070748 A1 * | 3/2020 | Kogure | B60J 5/06 | |
| 2020/0113070 A1 * | 4/2020 | Watanabe | B60R 16/0207 | |
| 2020/0176960 A1 * | 6/2020 | Tomosada | H02G 3/0456 | |

* cited by examiner

BEND PROTECTOR

CROSS-REFERENCE TO RELATED APPLICATIONS

This application is based on and claims priority under 35 USC 119 from Japanese Patent Application No. 2018-108322 filed on Jun. 6, 2018, the contents of which are incorporated herein by reference.

TECHNICAL FIELD

The present disclosure relates to a bend protector.

BACKGROUND ART

In related art, there are many situations in which a wiring direction of an electrical wire is limited, such as a situation in which the electrical wire is required to be bent by, for example, substantially 180 degrees. In order to meet such a need, there has been proposed a bend protector capable of holding the electrical wire in a bent state (see JP 2000-209732 A and JP 2005-295607 A).

However, when holding an electrical wire in a bent state, it can be extremely difficult to bend the electrical wire depending on the thickness of an electrical wire to be held, and in such a case, workability is deteriorated when the electrical wire is housed in a bend protector in the bent state.

SUMMARY OF INVENTION

The present disclosure has been made to solve such problems and has an object to provide a bend protector capable of suppressing deterioration of workability for housing an electrical wire in a bent state.

According to an aspect of the present invention, there is provided a bend protector for holding an electrical wire in a bent state, the bent protector including: an electrical wire inlet provided on one side and formed as an inlet of the electrical wire; an electrical wire outlet provided on the same side as the electrical wire inlet and formed as an outlet of the electrical wire; and a bend holder provided on the other side opposite to the one side so as to hold the electrical wire in the bent state, the electrical wire being guided from the electrical wire inlet and drawn out from the electrical wire outlet, in which the bend holder includes: a first wall formed along the electrical wire inlet; a second wall formed along the electrical wire outlet; and a pocket portion formed by the first wall and the second wall extending in a direction intersecting with respect to a direction from the one side toward the other side, and the pocket portion includes an internal space, and the internal space has a part having a distance greater than a distance between the first wall and the second wall.

According to an aspect of the present invention, since the pocket portion includes, in the internal space, the part having the distance greater than the distance between the first wall and the second wall, it is not necessary to bend the first electrical wire guided from the electrical wire inlet in a narrow space between the first wall and the second wall, and it is possible to bend gently in the internal space in the pocket portion. Therefore, since it is not necessary to excessively bend the electric wire, and since the first electrical wire may be housed in the bent state relatively easily, it is possible to reduce the deterioration of workability of housing the first electrical wire in the bent state.

DESCRIPTION OF EMBODIMENTS

Hereinafter, the present disclosure will be described according to preferred embodiments. It should be noted that the present disclosure is not limited to the embodiments described below, and can be modified as appropriate without departing from the gist of the present disclosure. Moreover, in the embodiments illustrated below, illustration and explanation of a part of the configuration are omitted, but it is needless to say that publicly known or well-known techniques are appropriately applied to the details of the omitted techniques as long as no contradiction occurs with the contents described below.

Figure 1:
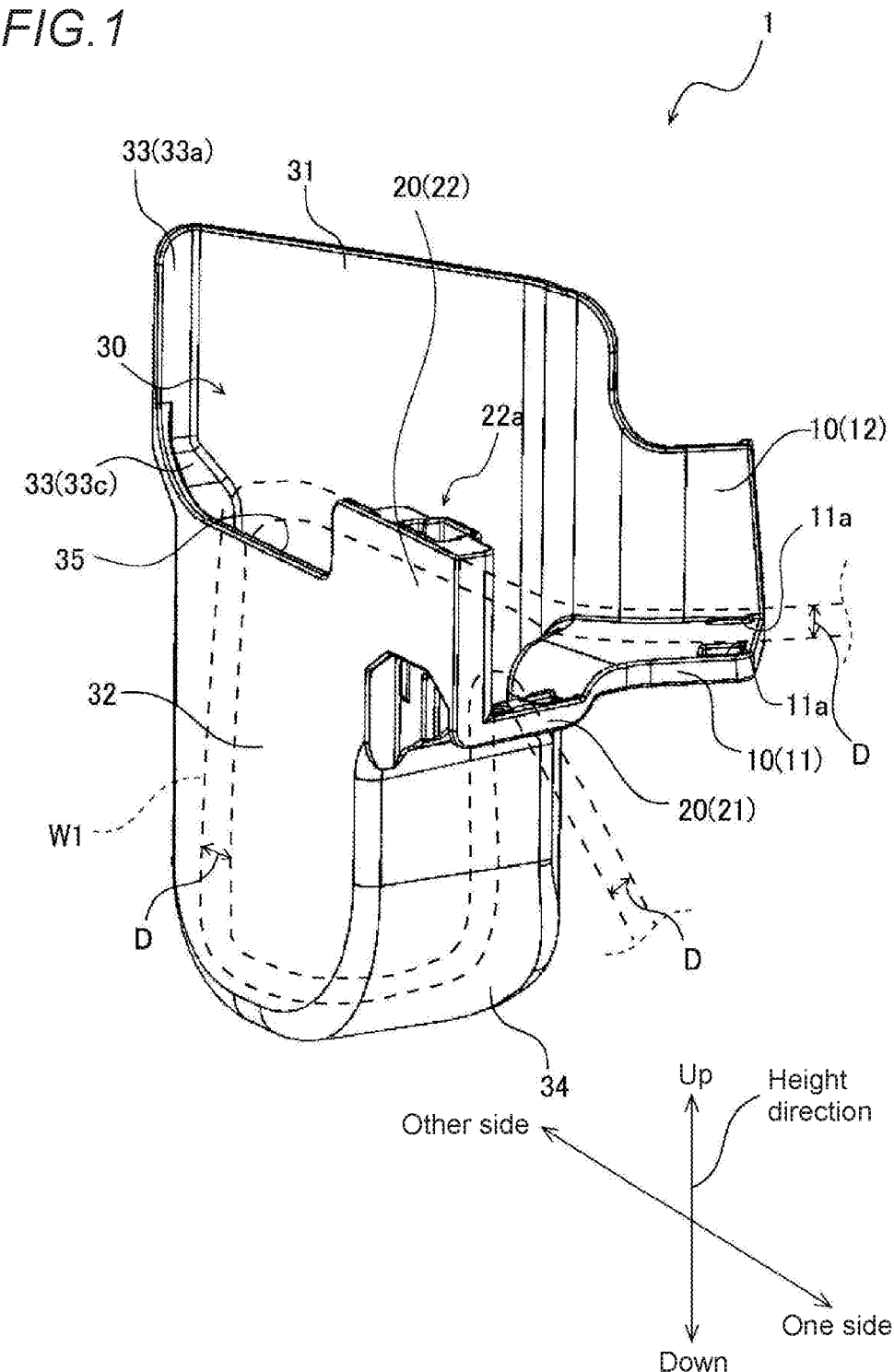
FIG. 1 is a first perspective view illustrating a bend protector according to an embodiment.
Figure 2:
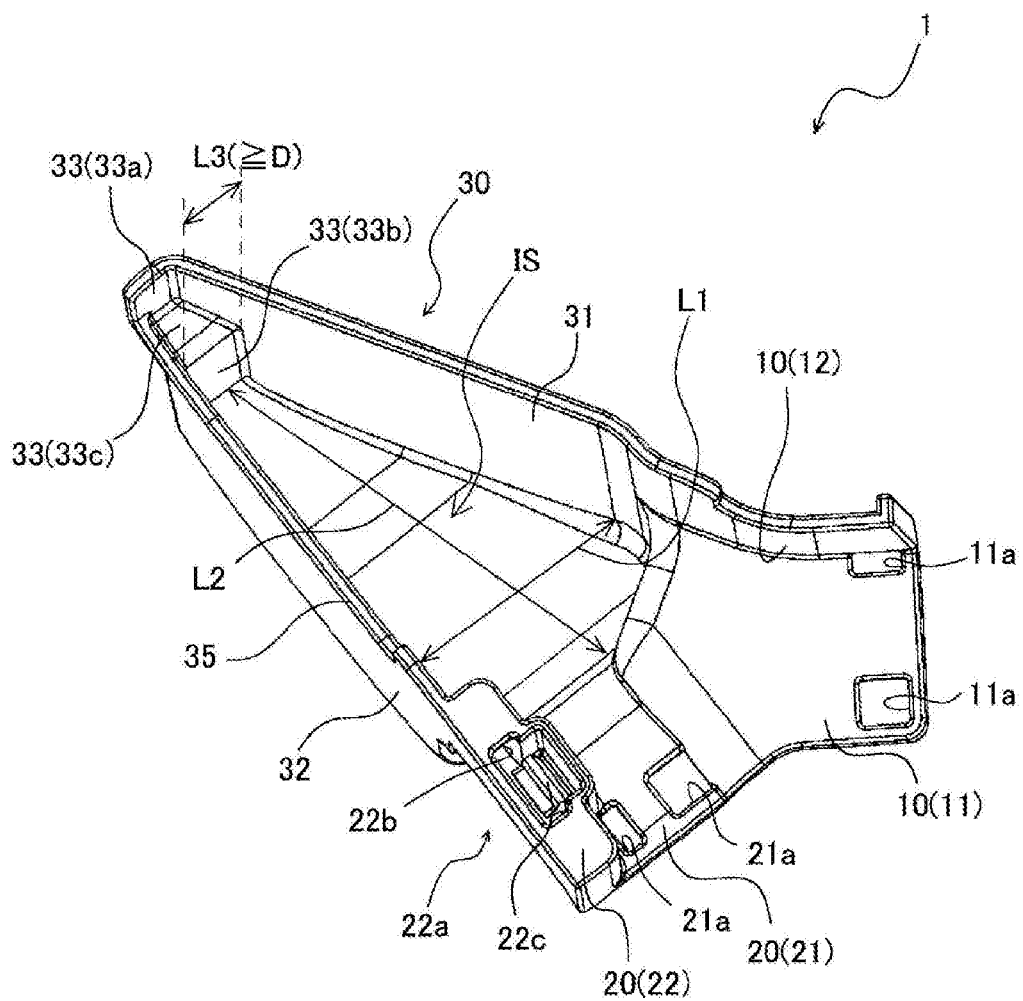
FIG. 2 is a second perspective view illustrating the bend protector according to the embodiment.
Figure 2:
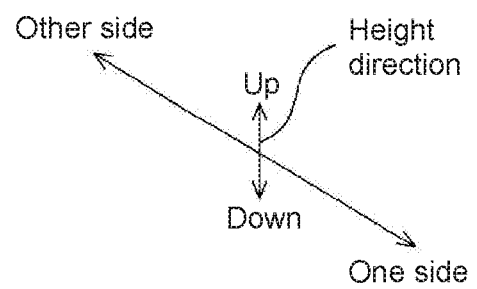
Figure 3:
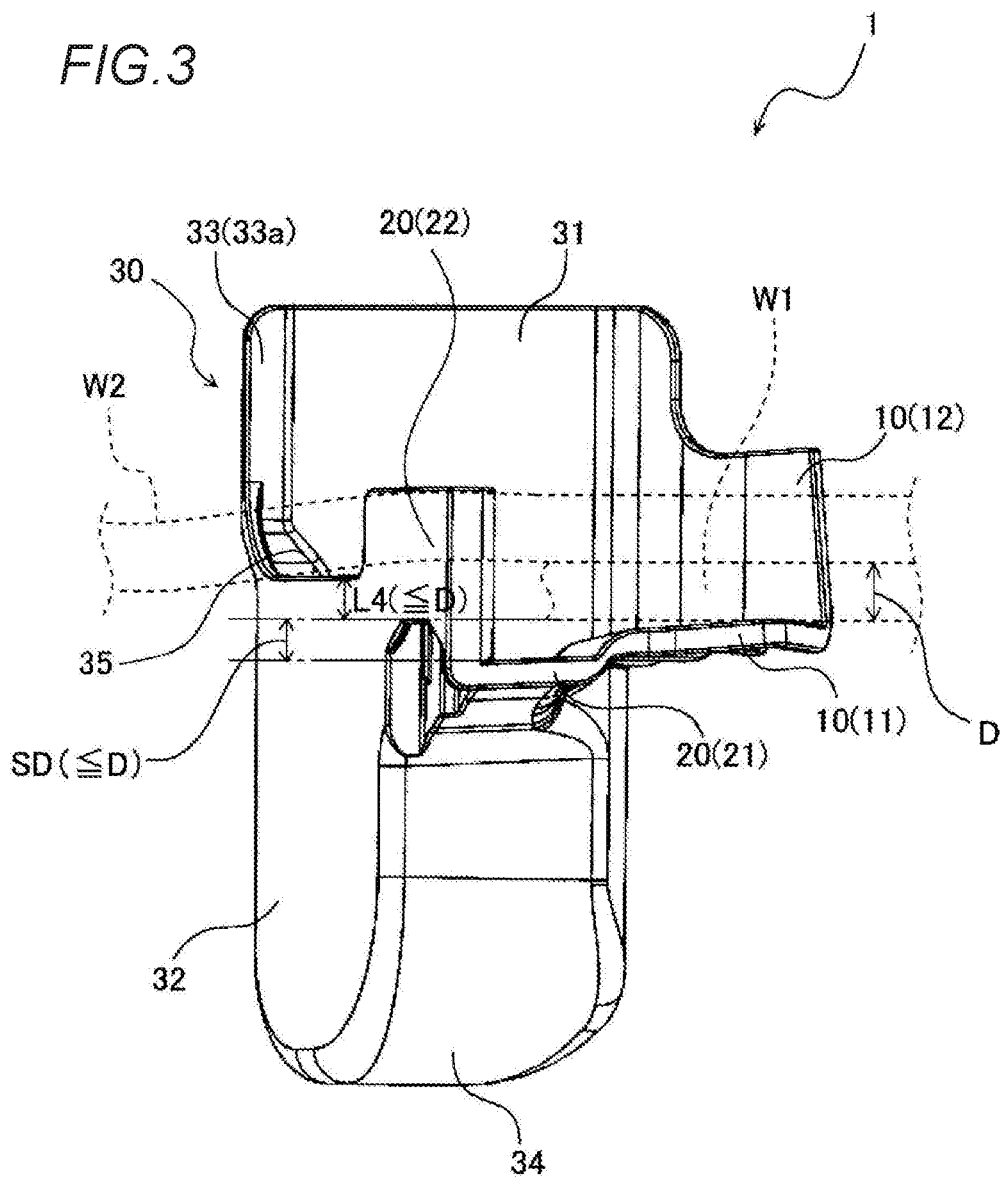
FIG. 3 is a first side view illustrating the bend protector according to the embodiment.
Figure 3:
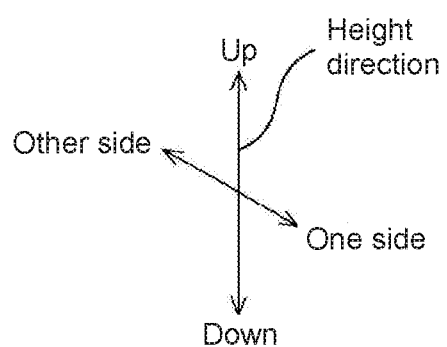

FIG. 1 is a first perspective view illustrating a bend protector according to an embodiment, and FIG. 2 is a second perspective view illustrating the bend protector according to the embodiment. FIG. 3 is a first side view illustrating the bend protector according to the embodiment, and FIG. 4 is a second side view illustrating the bend protector according to the embodiment.

Figure 4:
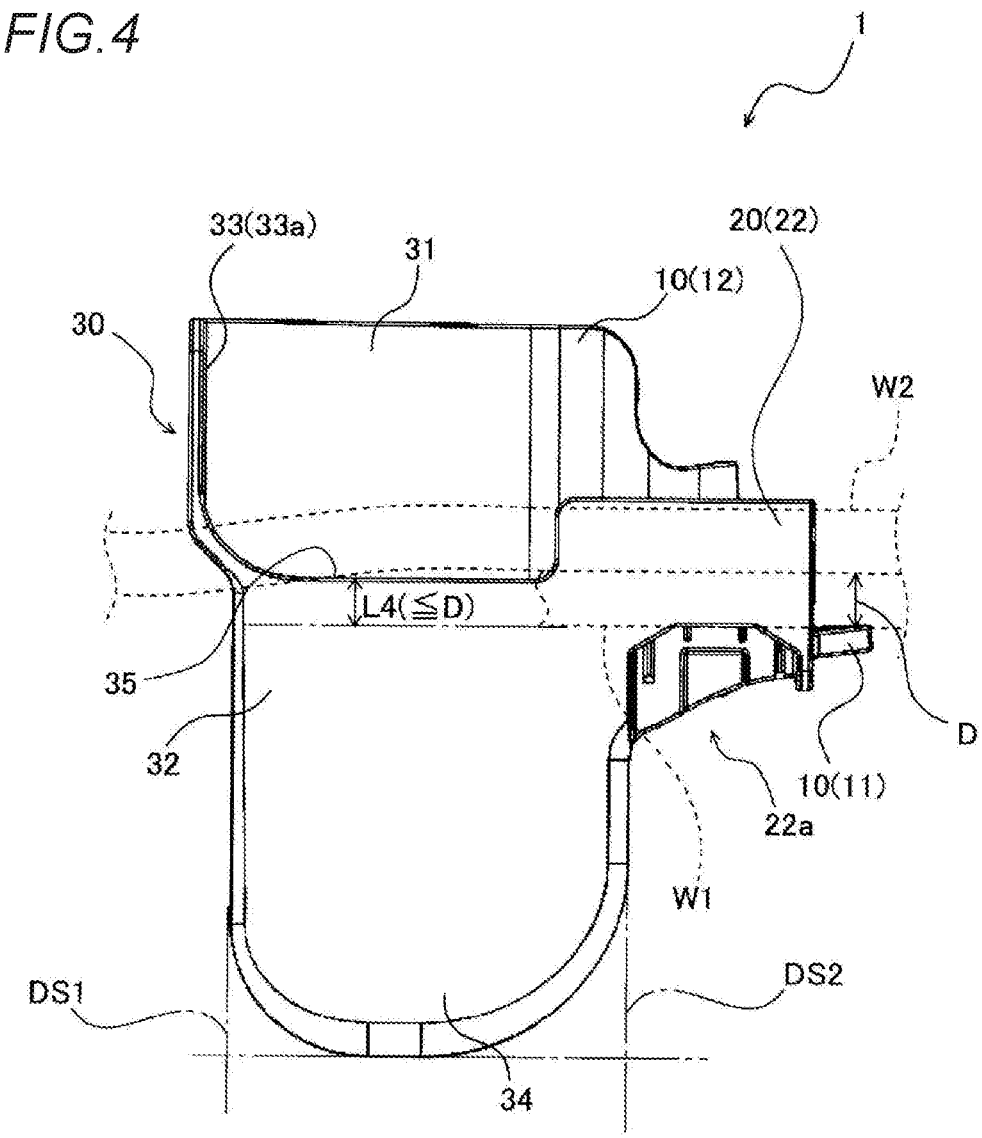
FIG. 4 is a second side view illustrating the bend protector according to the embodiment.
Figure 4:
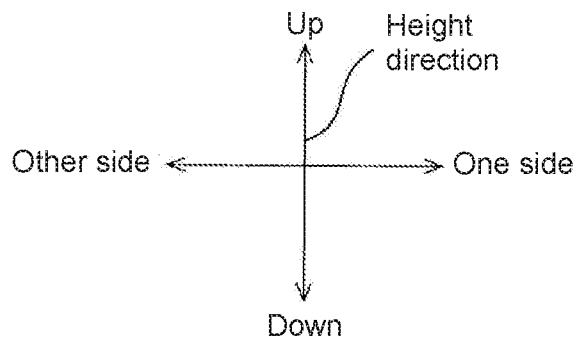

A bend protector 1 illustrated in FIGS. 1 to 4 is, for example, housing an electrical wire therein and attached to a bracket protruding from a vehicle body of a vehicle. In an embodiment, the bend protector 1 holds a first electrical wire W1 (electrical wire which is an object to be bent and held: see FIGS. 1, 3 and 4) connected to a negative terminal of a battery, and a second electrical wire W2 (see FIGS. 3 and 4) connected to a positive terminal of the battery. Such the bend protector 1 has a structure of housing an electrical wire for holding the first electrical wire W1 in a bent state as shown in FIG. 1, and holding the second electrical wire W2 in a substantially linear state as shown in FIGS. 3 and 4.

The bend protector 1 includes an electrical wire inlet 10, an electrical wire outlet 20, and a bend holder 30.

The electrical wire inlet 10 is a portion provided on one side of the bend protector 1 and serves as an inlet side of the first electrical wire W1 and the second electrical wire W2. The electrical wire inlet 10 is formed as a substantially L-shaped plate member, including a flat plate portion 11 on which the first electrical wire W1 is placed, and an upright surface portion 12 extending in a substantially vertical direction from the flat plate portion 11.

In an embodiment, it is assumed that the second electrical wire W2 is placed on the first electrical wire W1 in consideration of space constraints of the flat plate portion 11 (see FIGS. 3 and 4). However, it is not limited thereto, and the flat plate portion 11 may include a space where not only the first electrical wire W1, but also the second electrical wire W2 can be placed.

As shown in FIGS. 1 and 2, the flat plate portion 11 includes two openings 11a formed therein. The two openings 11a receive a binding band (not shown) to be inserted therein and the first electrical wire W1 placed on the flat plate portion 11 and the second electrical wire W2 on the first electrical wire W1 may be secured to the electrical wire inlet 10 by the binding band.

The electrical wire outlet 20 is provided on the same side (that is, on the one side) as the electrical wire inlet 10, and is a portion that serves as an outlet side of the first electrical wire W1. Like the electrical wire inlet 10, the electrical wire outlet 20 also has a substantially L-shape, including a flat plate portion 21 on which the first electrical wire W1 is placed, and an upright surface portion 22 extending in a substantially vertical direction from the flat plate portion 21.

Further, as shown in FIG. 2, the flat plate portion 21 includes two openings 21a through which the binding band is passed, and the first electrical wire W1 placed on the flat plate portion 21 may be secured to the electrical wire outlet 20 by the binding band.

Furthermore, in the embodiment, the upright surface portion 22 includes a lock portion 22a. The lock portion 22a includes a cylindrical tubular portion 22b substantially in a square shape extending in a height direction, and a lock arm 22c provided in the tubular portion 22b. In this example, a bracket extending from a vehicle body or the like includes an opening, and is inserted into the cylindrical tubular portion 22b, and after the insertion, the lock arm 22c is fitted into the opening, resulting in locked state. As a result, the bend protector 1 is attached to the vehicle body in a fixed state. In addition, the lock portion 22a is not limited to being provided in the electrical wire outlet 20, and accordingly, it may be provided elsewhere, such as in the electrical wire inlet 10, the bend holder 30, and the like.

Furthermore, as shown in FIG. 3, the electrical wire outlet 20 is at a different position from the electrical wire inlet 10 in the height direction such that a stepped portion is formed. A step distance SD is, for example, equal to or less than a diameter D of the first electrical wire W1 which is the object to be bent and held, and the electrical wire outlet 20 has substantially the same height as the electrical wire inlet 10. In addition, the step distance SD may not be limited to being equal to or less than the diameter D of the first electrical wire W1, and accordingly, the step distance SD may be greater than the diameter D.

The bend holder 30 is provided on the other side that is opposite to the one side on which the electrical wire inlet 10 and the electrical wire outlet 20 are provided, and holds the first electrical wire W1, which is introduced into the electrical wire inlet 10 and drawn out from the electrical wire outlet 20, in the bent state as shown in FIG. 1. The bend holder 30 includes a first wall 31 and a second wall 32. The first wall 31 is formed along the electrical wire inlet 10 and, more specifically, is formed to extend from the upright surface portion 12 of the electrical wire inlet 10 to the other side. Like the first wall 31, the second wall 32 is formed along the electrical wire outlet 20 and is formed to extend from the upright surface portion 22 of the electrical wire outlet 20 to the other side.

In addition, the bend holder 30 includes a bend wall 33. The bend wall 33 is a wall on the other side at which connects the first wall 31 and the second wall 32. In an embodiment, the bend wall 33 is formed in a substantially stepped shape as shown in FIG. 2 and also includes a first bend wall 33a provided at an end of the other side, a second bend wall 33b provided at a location of the one side closer than the first bend wall 33 and a stage, in the height direction, lower than the first bend wall 33a, and a stepped portion 33c connecting the first bend wall 33a and the second bend wall 33b. In an embodiment, the second bend wall 33b has a length L3 that is equal to or greater than the diameter D of the first electrical wire W1 which is an object to be bent. The length L3 is the shortest distance from the first wall 31 to the second wall 32 on the second bend wall 33b.

Furthermore, the bend holder 30 includes a pocket portion 34. The pocket portion 34 is a portion formed by extending the first wall 31 and the second wall 32 downward (an example of a direction that intersects with respect to a direction from one side toward the other side), as shown in FIGS. 1, 3 and 4. As shown in FIG. 2, the pocket portion 34 includes, in an internal space IS, a part having a distance L2 greater than a distance between the first wall 31 and the second wall 32 (for example, symbol L1 shown in FIG. 2). In an embodiment, a distance L1 between the first wall 31 and the second wall 32 is a distance in a direction orthogonal to a plane including the direction from one side toward the other side and the height direction. In addition, the part having the distance L2 is a portion from the end of the other side of the electrical wire inlet 10 or the electrical wire outlet 20 to the second bend wall 33b and is to extend in the direction from one side toward the other side in the embodiment.

Further, as shown in FIG. 4, the pocket portion 34 is in a substantially U-shape in a plan view. The term "plan view" as used herein refers to when a plane is viewed from the front, in which the plane includes the direction from one side toward the other side and a direction of bending and protruding (height direction in the embodiment) to be described below.

In addition, the second wall 32 of the bend holder 30 includes a notch portion 35. The notch portion 35 is a portion formed by cutting downward to be lower than the upper end position of the first wall 31. The notch portion 35 is formed so as to be cut out to have a height (see reference numeral L4) that is equal to or less than a height obtained by adding the diameter D of the first electrical wire W1 to the electrical wire inlet 10.

Next, a state of housing the electrical wires W1 and W2 in the bend protector 1 according to the embodiment will be described with reference to FIGS. 1 to 4.

First, an operator places the first electrical wire W1 on the electrical wire inlet 10. Then, the operator bends the first electrical wire W1 to push it toward the pocket portion 34. As a result, the first electrical wire W1 is in the bent state in which it is convex downward as shown in FIG. 1.

The pocket portion 34 includes, in the internal space IS, a part having a distance L2 greater than the distance L1 between the first wall 31 and the second wall 32. For this reason, rather than bending the first electrical wire W1 by substantially 180 degrees at the distance L1 between the first wall 31 and the second wall 32, the operator may use the part having the distance L2 of the pocket portion 34 to bend the first electrical wire W1 relatively gently. After bending, the operator places the first electrical wire W1 on the electrical wire outlet 20.

Since the pocket portion 34 is substantially formed in U-shape in the plan view, the pocket portion 34 is shaped in accordance with the bending of the first electrical wire W1, and dead spaces DS1 and DS2 shown in FIG. 4 may be eliminated as compared with a case where the pocket portion 34 is formed in a rectangular shape.

Furthermore, since the length L3 of the bend wall 33 (in particular, the second bend wall 33b) is equal to or greater than the diameter D of the first electrical wire W1, the length L3 of the bend wall 33 is configured to prevent difficulty of inserting the first electrical wire W1 into the pocket portion 34 such that the first electrical wire W1 is not caught in a narrow gap between the first wall 31 and the second wall 32 (gap in the vicinity of the second bend wall 33b).

Next, the operator places the second electrical wire W2 on the first electrical wire W1 and also places it on the notch portion 35. Since the notch portion 35 is cut out to have a height that is equal to or less than the height obtained by adding the diameter D of the first electrical wire W1 with respect to the height position of the electrical wire inlet 10, when the second electrical wire W2 is linearly arranged in the height direction, the second electrical wire W2 may be routed two-dimensionally without being interfered by the second wall 32. More specifically, when the second wall 32 has substantially the height of the first wall 31, the routing direction of the second electrical wire W2 is limited to an upper direction. For example, when routing the second electrical wire W2 in the direction from the one side toward the other side, it is necessary to re-bend the second electrical wire W2, which has been bent in the upper direction once, toward the other side. As a result, this causes deteriorating workability of routing an electric wire. However, since the second wall 32 includes the notch portion 35 described above, the wiring workability may be improved.

Thus, with the bend protector 1 according to the embodiment, since the pocket portion 34 includes, in the internal space IS, a part having the distance L2 greater than the distance L1 between the first wall 31 and the second wall 32, it is not necessary to bend the first electrical wire W1 guided from the electrical wire inlet 10 in a narrow space between the first wall 31 and the second wall 32, and it is possible to bend gently in the internal space IS in the pocket portion 34. Therefore, since it is not necessary to excessively bend the electric wire, and since the first electrical wire W1 may be housed in the bent state relatively easily, it is possible to reduce the deterioration of workability of housing the first electrical wire W1 in the bent state.

In addition, since the pocket portion 34 is substantially formed in U-shape in the plan view, when the first electrical wire W1 is gently bent, the dead spaces DS1 and DS2 may be eliminated. As a result, the bend protector 1 which is smaller and lighter as compared with a rectangular shape in a plan view may be provided.

Further, since the second wall 32 includes the notch portion 35 cut out to have a height that is equal to or less than a height obtained by adding the diameter D of the first electrical wire W1 which is an object to be bent and held to the height position of the electrical wire inlet 10, when holding the second electrical wire W2 on the bend protector 1 in a state where the second electrical wire W2 is placed on the bent and held first electrical wire W1, it is possible to be routed from the electrical wire inlet 10 to the notch portion 35 two-dimensionally (that is, like a planar and less displacement in the height direction), and improve the routing performance for holding the second electrical wire W2.

Further, since the length L3 of the bend wall 33 (in particular, second bend wall 33b) is equal to or greater than the diameter D of the first electrical wire W1 which is an object to be bent, for example, the length L2 of the second bend wall 33b is less than the diameter D of the first electrical wire W1, and it is possible to prevent a situation in which the first electrical wire W1 is caught in the narrow gap between the first wall 31 and the second wall 32, causing difficulty of insertion into the pocket portion 34.

Although the disclosure has been described based on the embodiments, the present disclosure is not limited to the embodiments described above, and accordingly, modifications may be made without departing from the gist of the present disclosure, and well-known and publicly known techniques may be combined.

For example, in the embodiment, while the first wall 31 and the second wall 32 of the bend protector 1 extend downward to form the pocket portion 34, the present disclosure is not limited thereto, and accordingly, the direction of extension may be the upper direction, and may be the direction on the plan view described above. That is, the direction of extension is not particularly limited as long as it crosses the direction from one side to the other side.

Further, in an embodiment, while the distance L2 of the pocket portion 34 extends in the direction from the one side toward the other side, the present disclosure is not limited thereto, and accordingly, the pocket portion 34 may include, in the internal space IS, a part having a long distance L2 in the other direction.

REFERENCE SIGNS LIST

1 bend protector
10 electrical wire inlet
20 electrical wire outlet
30 bend holder
31 first wall
32 second wall
34 pocket portion
35 notch portion
IS internal space

What is claimed is:

1. A bend protector for holding an electrical wire in a bent state, the bend protector comprising:
    an electrical wire inlet provided on one side and formed to receive the electrical wire in a first direction;
    an electrical wire outlet provided on the one side and formed to allow the electrical wire to be drawn out in a second direction opposite to the first direction; and
    a bend holder provided on the other side opposite to the one side so as to hold the electrical wire in the bent state, the electrical wire being guided from the electrical wire inlet and drawn out from the electrical wire outlet,
    wherein the bend holder includes:
        a first wall formed along the electrical wire inlet;
        a second wall formed along the electrical wire outlet; and
        a pocket portion formed by the first wall and the second wall extending in a direction intersecting a direction from the one side toward the other side, and
    wherein the pocket portion includes an internal space, and the internal space has a part having a distance greater than a distance between the first wall and the second wall.

2. The bend protector according to claim 1, wherein the pocket portion is formed in a substantially U-shape in a plan view.

3. The bend protector according to claim 2, wherein the second wall includes a notch portion cut out to have a height that is equal to or less than a height obtained by adding a diameter of the electrical wire bent and held with respect to a height position of the electrical wire inlet.

4. The bend protector according to claim 1, wherein the first wall and the second wall face each other.

* * * * *